US012127594B2

(12) United States Patent
Hon et al.

(10) Patent No.: US 12,127,594 B2
(45) Date of Patent: Oct. 29, 2024

(54) HEAT-NOT-BURN SMOKING DEVICE

(71) Applicant: FONTEM VENTURES B.V., Amsterdam (NL)

(72) Inventors: Lik Hon, Beijing (CN); Zhuoran Li, Beijing (CN); Fucheng Yu, Beijing (CN)

(73) Assignee: FONTEM VENTURES B.V., Amsterdam (NL)

( * ) Notice: Subject to any disclaimer, the term of this patent is extended or adjusted under 35 U.S.C. 154(b) by 901 days.

(21) Appl. No.: 17/264,785

(22) PCT Filed: Aug. 1, 2018

(86) PCT No.: PCT/CN2018/098052

§ 371 (c)(1),
(2) Date: Jan. 29, 2021

(87) PCT Pub. No.: WO2020/024154

PCT Pub. Date: Feb. 6, 2020

(65) Prior Publication Data

US 2023/0118301 A1 Apr. 20, 2023

(51) Int. Cl.
*A24F 40/46* (2020.01)
*A24D 1/20* (2020.01)
(Continued)

(52) U.S. Cl.
CPC .............. *A24F 40/465* (2020.01); *A24D 1/20* (2020.01); *H05B 6/36* (2013.01)

(58) Field of Classification Search
None
See application file for complete search history.

(56) References Cited

U.S. PATENT DOCUMENTS 3,698,400 A 10/1972 Tucker
5,060,671 A 10/1991 Counts et al.
5,613,505 A * 3/1997 Campbell .............. A24F 40/53 131/194

(Continued)

FOREIGN PATENT DOCUMENTS

CN 203801738 U 9/2014
CN 105307525 A 2/2016

(Continued)

OTHER PUBLICATIONS

International Preliminary Report on Patentability for International Application No. PCT/CN2018/098052 dated Feb. 2, 2021.

(Continued)

*Primary Examiner* — Ross N Gushi
(74) *Attorney, Agent, or Firm* — Perkins Coie LLP; Kenneth H. Ohriner

(57) ABSTRACT

A heat-not-burn device includes a heating assembly (300) having a battery (211) in a housing (201), with the battery (211) electrically connected to an electronic controller (212) and to a puff sensor (205) or a switch (206). The housing (201) has a receptacle (221) for receiving a smoking article (100). A plurality of induction coils (222) are electrically connected to the electronic controller (212), with the induction coils (222) longitudinally spaced apart along the receptacle (221). The smoking article (100) has a plurality of spaced apart conductive elements or plates (124) with smoking material (125), such as tobacco, between adjacent conductive elements or plates (124).

9 Claims, 6 Drawing Sheets

(51) Int. Cl.

| | |
|---|---|
| ***A24F 40/465*** | (2020.01) |
| ***H05B 6/36*** | (2006.01) |

(56) References Cited

U.S. PATENT DOCUMENTS

| | | | | |
|---|---|---|---|---|
| 6,536,442 | B2 | 3/2003 | St. Charles et al. | |
| 9,427,022 | B2 | 8/2016 | Levin et al. | |
| 9,439,456 | B2 | 9/2016 | Liu | |
| 9,532,600 | B2 | 1/2017 | Thorens et al. | |
| 9,713,345 | B2 | 7/2017 | Farine et al. | |
| 10,219,543 | B2 * | 3/2019 | Gill | B65D 43/02 |
| 11,019,848 | B2 * | 6/2021 | Rojo-Calderon | A24D 1/20 |
| 2014/0000638 | A1 | 1/2014 | Sebastian et al. | |
| 2015/0230521 | A1 | 8/2015 | Talon | |
| 2015/0313286 | A1 | 11/2015 | Koller | |
| 2017/0055575 | A1 | 3/2017 | Wilke et al. | |
| 2017/0071250 | A1 | 3/2017 | Mironov et al. | |
| 2017/0119046 | A1 | 5/2017 | Kaufman et al. | |
| 2017/0119051 | A1 | 5/2017 | Blandino | |
| 2017/0156403 | A1 | 6/2017 | Gill et al. | |
| 2017/0224019 | A1 | 8/2017 | Kuczaj | |
| 2019/0098938 | A1 | 4/2019 | Griffith et al. | |

FOREIGN PATENT DOCUMENTS

| | | | |
|---|---|---|---|
| CN | 105942584 | A | 9/2016 |
| CN | 107373761 | A | 11/2017 |
| CN | 108348005 | A | 7/2018 |
| CN | 108348011 | A | 7/2018 |
| DE | 202014106041 | U1 | 3/2015 |
| GB | 1183438 | A | 3/1970 |
| WO | 2017036959 | A1 | 3/2017 |
| WO | 2017068098 | A1 | 4/2017 |
| WO | 2018002084 | A1 | 1/2018 |

OTHER PUBLICATIONS

European Supplementary Partial Search Report for European Application No. 18928534.9; Date of Mailing: Feb. 18, 2022; 8 pages.

International Search Report and Written Opinion for PCT/CN2018/098052, dated Apr. 30, 2019.

JPO, Notice of Rejection for Japanese Application No. 2021-505781; Date of Mailing: Jun. 28, 2022; with English translation, 25 pages.

EPO, "extended European Search Report", for European Application No. 18928534.9, mail date Sep. 1, 2022, 13 pages.

JPO, Decision of Rejection for Japanese Application No. 2021-505781; Date of Mailing: Oct. 11, 2022; with English translation, 7 pages.

IP Office Japan, "Notice of Reasons for Refusal", for Japanese Application No. 2021-505781, Mar. 22, 2023, English Machine Translation, 2 pages.

* cited by examiner

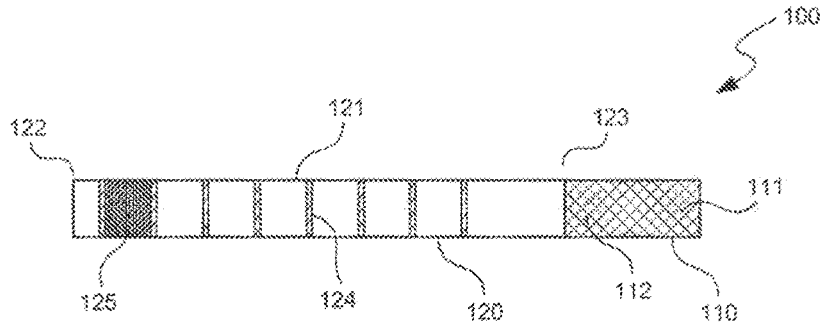
FIG. 1A
FIG. 1B
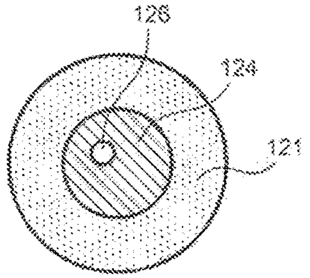
FIG. 1C
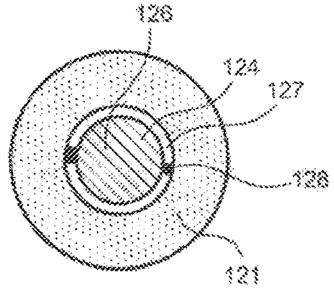
FIG. 1D
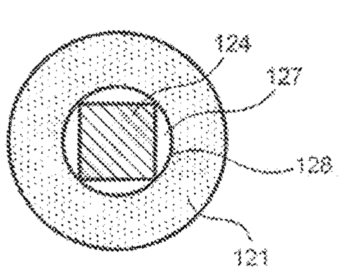

HEAT-NOT-BURN SMOKING DEVICE

TECHNICAL FIELD

The field of the invention is smoking devices and more particularly heat-not-burn electronic smoking devices.

BACKGROUND OF THE INVENTION

Heat-not-burn devices, also known as heated tobacco devices, operate by heating tobacco or a similar flavor medium, which creates an inhalable vapor, rather than smoke. The tobacco or similar flavor medium is heated by a heating element in the device, while the tobacco itself does not burn. In contrast to conventional cigarettes, where the tobacco burns and produces smoke, with heat-not-burn devices, the intention is to produce vapor instead of smoke.

SUMMARY OF THE INVENTION

A heat-not-burn (HNB) smoking assembly (hereinafter the "smoking assembly") includes an HNB smoking article (hereinafter the "smoking article") received in an open end of an HNB smoking device (hereinafter the "smoking device"). The smoking article may include multiple conductive elements that may generate induced current in alternative magnetic fields generated by multiple inductive coils in the smoking device.

BRIEF DESCRIPTION OF THE DRAWINGS

FIG. 1A is a section view of an embodiment of the smoking article.

FIG. 1B is a cross-section view of an embodiment of the smoking article.

FIG. 1C is a cross-section view of another embodiment of the smoking article.

FIG. 1D is a cross-section view of another embodiment of the smoking article.

DETAILED DESCRIPTION OF THE INVENTION

Figure 2:
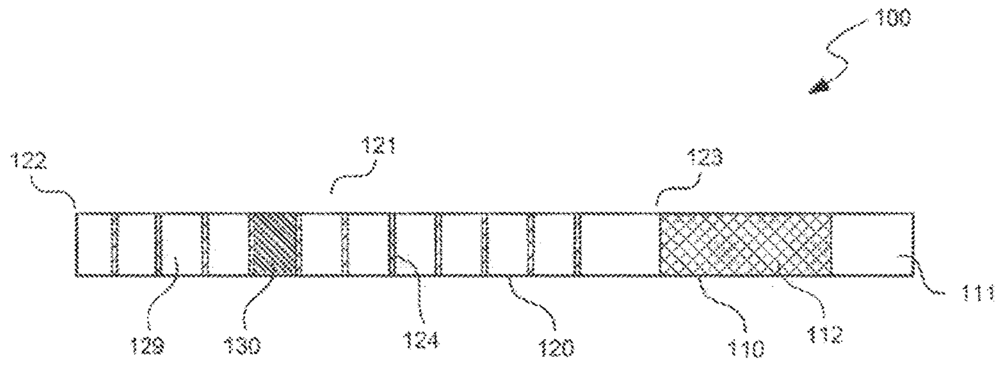
FIG. 2 is a section view of an embodiment of the smoking article.

A conductive element may generate induced current in an alternative magnetic field to heat one or more smoking materials to create a vapor. A smoking assembly may have multiple conductive elements coupled with multiple inductive coils, respectively. One, two, three, or more inductive coils may be activated at the same time to provide one, two, three, or more alterative magnetic fields that generate induced current in the one, two, three, or more conductive elements (e.g., induction heating plates) coupled with the corresponding inductive coils. The smoking assembly may include a smoking article received into a smoking device; the smoking article may have the conductive elements and smoking materials, and the smoking device may include the inductive coils and power source. Although the following description refers to a smoking article, a smoking device and a smoking assembly, the devices and methods disclosed herein use heat-not-burn techniques, which generate vapor rather than smoke.

I. Smoking Article

FIG. 1A shows an embodiment of the smoking article 100 including an inhalation unit 110 and a smoking material unit 120 in airflow communication with each other.

The smoking article 100 includes a mouthpiece 111, and optionally a filter 112 including one or more filter materials. Examples of filter materials include, without limitation, filter materials suitable for conventional cigarettes, porous materials, and absorbent materials.

The smoking material unit 120 has a first housing 121 with a first end 122 and a second end 123; multiple conductive elements 124 in the first housing 121; and one or more smoking materials 125 in the first housing 121.

The first housing 121 may include one or more materials that are not conductive, e.g., paper.

The conductive elements include one or more conductive materials or an inert core with one or more conductive materials. Examples of the conductive materials include, without limitation, metals (e.g., aluminum, barium calcium, chromium, cobalt, copper, gold, ion, iridium, lead, lithium, magnesium, manganese, molybdenum, muonium, niobium, nickel, osmium, palladium, platinum, rhenium, rhodium, ruthenium, sodium, silver, steel, strontium, tantalum, thallium, titanium, tungsten, vanadium, zinc, zirconium) and alloys formed by any combination thereof (e.g., brass), and conductive carbon (e.g., graphite, graphene, and/or carbon-based nanomaterials).

The conductive elements 124 may have one or more openings 126 (FIG. 1B) and/or a gap 127 between the conductive elements 124 and the first housing 120 (FIG. 1C) to allow air flow from the first end 122 of the first housing 120 to reach the mouthpiece 111.

The conductive elements 124 may contact or be attached to the first housing 121 (FIGS. 1B-1D). One or more of the conductive elements 124 may be attached to the first housing 121 by a support 128 (FIG. 1C). Alternatively, one or more of the conductive elements 124 may be detachable from the first housing 121.

The conductive elements 124 and the intersection of the first housing 121 may have the same or different shapes. For example, the first housing 121 may have a circular intersection, and the conductive elements 124 may have a square shape (FIG. 1D). Alternatively, the first housing 121 may have a square intersection, and the conductive elements 124 may have a circular shape.

The conductive elements may be conductive plates.

FIG. 2 shows an embodiment of the smoking article 200 where two adjacent conductive elements 124 may define a first chamber 129 in the first housing 120. The first chamber 129 contains one or more smoking materials. In certain embodiments, each first chamber 129 may contain about the same amount of the same smoking materials. Alternatively, the first chambers 129 may contain different amounts and/or different types of the smoking materials. As shown in FIG. 2, the smoking material unit 120 may further include one or more non-conductive separators 130 between the first chambers 129 containing different smoking materials. The conductive elements 124 may be configured with various arrangements. For example, the conductive elements 124 may be evenly spaced apart from each other. Alternatively, the distances between adjacent conductive elements 124 may vary. Optionally, the conductive elements 124 are plates which are substantially parallel to each other and perpendicular to the longitudinal axis of the smoking article. Unless otherwise specified, "substantially parallel to each other" implies a maximum alignment error of ±10°; and "substantially perpendicular" implies a maximum alignment error of ±10°. Alternatively, any two of the plates may be aligned at an angle to each other, wherein the angle may be 0-±80°, 0-±70°, 0-±60°, 0-±50°, 0-±40°, 0-±30°, 0-±20°, or 0-±10°. Unless otherwise specified, an angle between two plates means an angle between a surface of one plate of the two plates and a surface of the other plate.

The smoking materials may be solid materials containing one or more tobacco products. Alternatively, one or more of the smoking materials 125 may include a porous material soaked with an e-liquid. Examples of the porous materials include, without limitation, micro-porous ceramic, foamed ceramic, natural fiber, artificial fiber or foam metal material. Examples of fibers include, without limitation, ceramic fiber, quartz fiber, glass fiber, and aramid fiber. An e-liquid may produce a mist or vapour when heated by an atomizer. It may include one or more chemicals selected from the group consisting of propylene glycol (PG), vegetable glycerin (VG), polyethylene glycol 400 (PEG400), and alcohols, and one or more agents selected from the group consisting of flavors (e.g., tobacco flavors, food flavors such as flavors of candy, nuts, fruit, bakery, dairy, cream, spice and vegetable, beverage flavors, floral flavors, sweet flavors, and sour flavors) and nicotine. The e-liquid may include nicotine at various concentrations or may be nicotine-free. Nicotine may be synthetic or tobacco-derived nicotine products.

A heat-not-burn smoking article may have a plurality of spaced apart conductive plates; a volume of a smoking material between adjacent conductive plates; and the conductive plates and the smoking material contained within a cylindrical container. The cylindrical container may be a wrapper (e.g., paper) around the conductive plates and the smoking material. The conductive plates may be equally spaced apart and parallel to each other.

II. Smoking Device

FIGS. 3A-3D shows various embodiments of the smoking assembly 300 including various embodiments of the smoking device 200 coupled with an embodiment of the smoking article 100 having multiple conductive elements and one or more smoking materials. The smoking device 200 includes: a second housing 201 with a battery unit 210 and a heating unit 220 in the housing 201; the battery unit 210 containing a battery 211; and the heating unit 220 containing a receptacle 221 for receiving the smoking article 100, and a plurality of induction coils 222 spaced apart along the receptacle 221.

The housing 201 may have a closed end 202 and an open end 203. The battery unit 210 may be at the closed end 202, and the heating unit 220 may be at the open end 203. The housing 201 may include one or more conductive materials to shield the magnetic field produced by the inductive coils.

Optionally, the battery unit 210 further includes an electronic controller or a control circuit 212 that activates the heating unit 220 when the electronic controller or control circuit 212 is activated.

The heating unit 220 includes: a receptacle 221 for receiving the smoking article 100 from the open end 203; and multiple induction coils 222 attached to the receptacle 221. One, two, three, or more of the induction coils 222 may be selectively and/or independently activated by the control circuit 212 to generate one or more alternative magnetic fields in the receptacle 221. One or more of the induction coils 222 are coupled with one or more of the conductive elements in the smoking article 100 to generate induced current. Unless otherwise specified, a conductive element is "coupled" to an induction coil when an alternative magnetic field created by the induction coil can generate induced current on the conductive element sufficient to create heat useful to generate vapor. One, two, three, four, five, six, seven, eight, nine, or ten of the induction coils 222 may be activated simultaneously. Optionally, the induction coils 222 are activated sequentially from the distal to the proximal of the open end 203.

The induction coils 222 are spaced apart along the receptacle 221 and may have various arrangements to couple with the conductive elements of the smoking article 100 accordingly. For example, the induction coils 222 may be evenly spaced with each other. Unless otherwise specified, the distance between two induction coils is the shortest distance between the two induction coils. Alternatively, the distances between adjacent induction coils 222 may vary. Optionally, the induction coils 222 may be substantially parallel to each other. Alternatively, the induction coils 222 may be positioned at varied angles with each other. In certain embodiments, an angle between two induction coils is the angle between two center axes which the two induction coils wind around, respectively. The angles between any two induction coils may be 0-±80°, 0-±70°, 0-±60°, 0-±50°, 0-±40°, 0-±30°, 0-±20°, or 0-±10°. Alternatively, an angle between two induction coils is an angle between two conductive plates coupled with the two induction coils, respectively.

The heating unit 220 may further include a sealing element 224 proximal to the open end 202 that contacts the smoking article 100. The sealing element may be composed of silicon, rubber, and/or other suitable polymers. Optionally, the receptacle 221 has a closed end 232 that seals the receptacle from the battery unit 210 to avoid contamination of the battery 211 and/or the control circuit 212.

The smoking device 200 may include an air inlet 204 on the housing 201 to allow air flow into the receptacle 221. The air inlet 204 may be positioned on either side of the closed end 232 of the receptacle 221. When the air inlet 204 is positioned between the battery and the closed end 232, a one-way valve 207 may be configured at the closed end 232 allowing air to flow only in one direction into the receptacle 221 (FIGS. 3C and 3D).

Figure 3A:
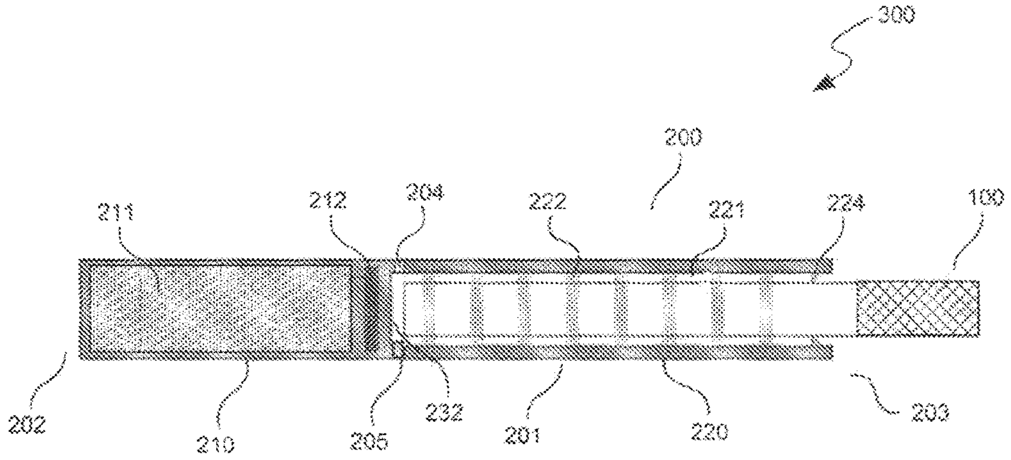
FIG. 3A is a section view of an embodiment of the smoking assembly.
Figure 3B:
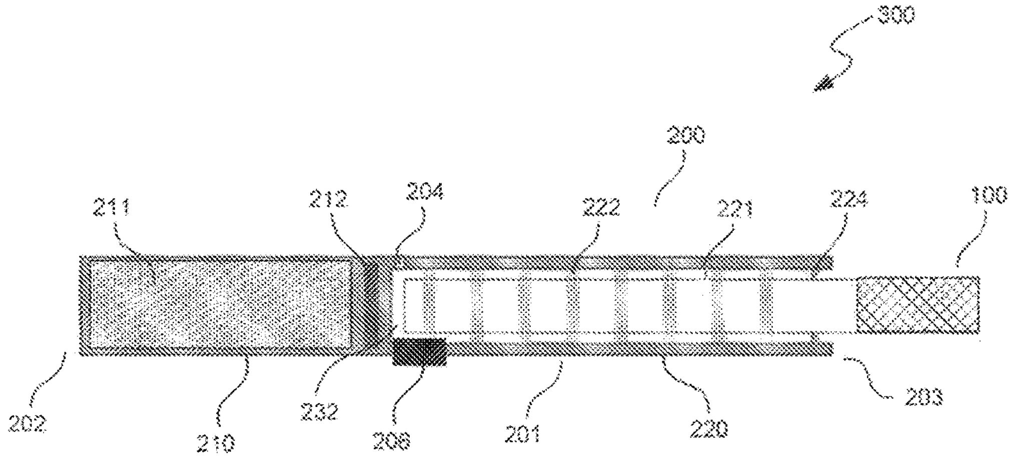
FIG. 3B is a section view of another embodiment of the smoking assembly.
Figure 3C:
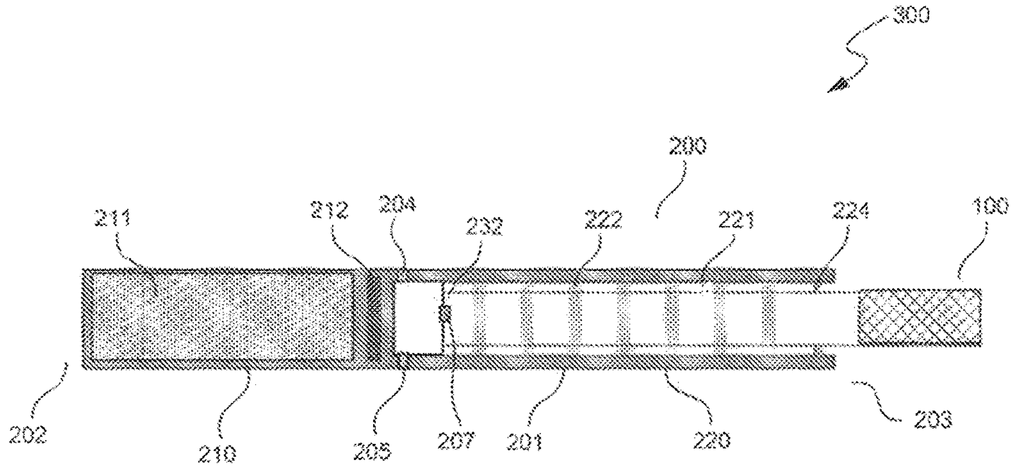
FIG. 3C is a section view of another embodiment of the smoking assembly.

Optionally, the smoking device 200 includes a sensor 205 (e.g., an airflow sensor, pressure sensor, or a puff sensor) on or in the second housing 201 that may activate the control circuit 212 when sensing inhalation (FIGS. 3A and 3C).

Figure 3D:
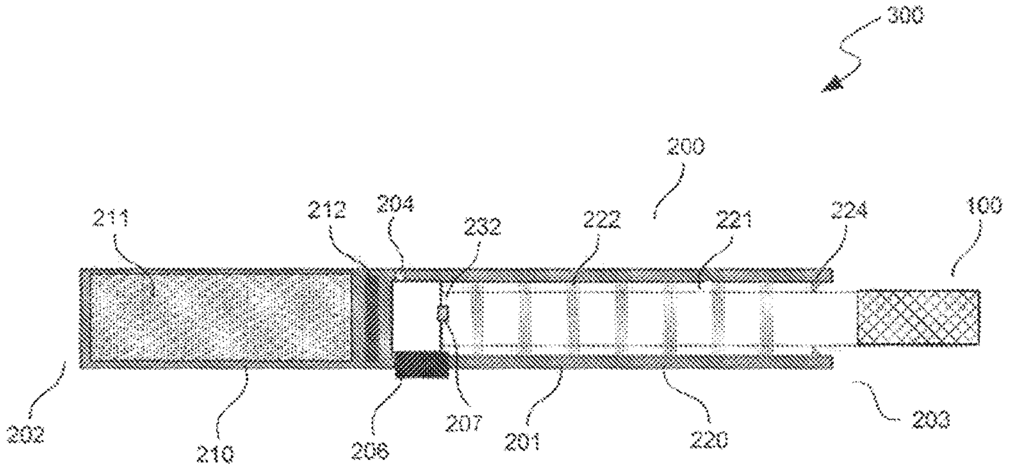
FIG. 3D is a section view of another embodiment of the smoking assembly.

Alternatively, the smoking device 200 may include a switch 206 which may activate the control circuit 212 when turned on (FIGS. 3B and 3D).

Figure 4:
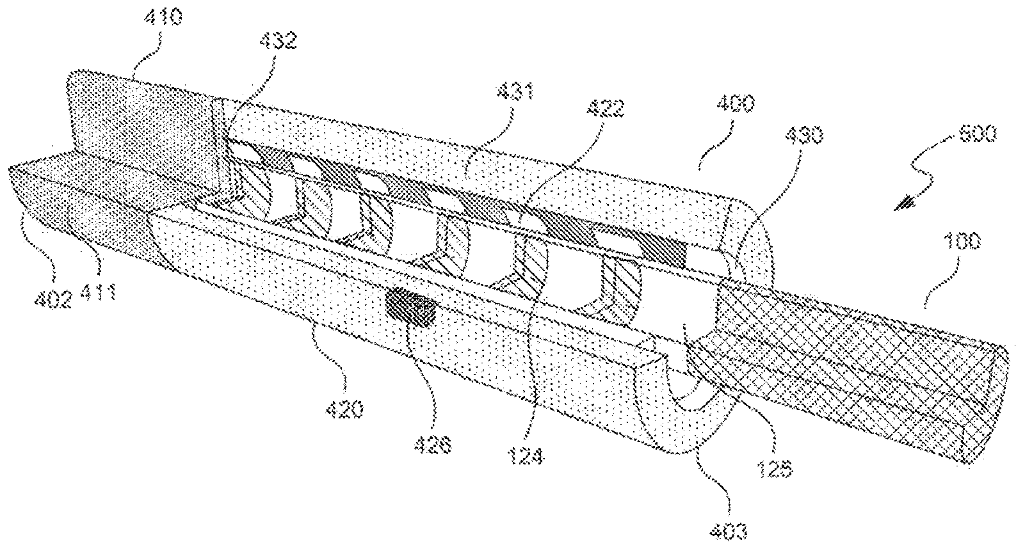
FIG. 4 is a cutout perspective view of an embodiment of the smoking assembly.
Figure 5:
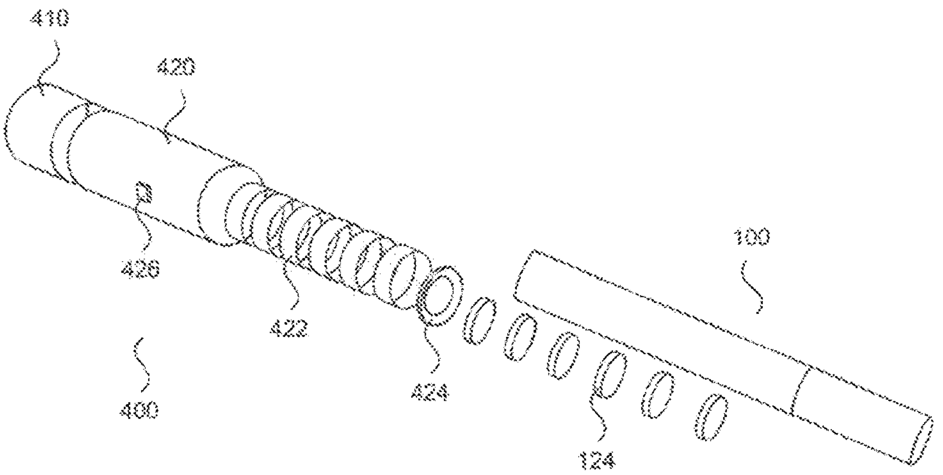
FIG. 5 is an explosive perspective view of the embodiment of the smoking assembly of FIG. 4.

FIGS. 4 and 5 show another embodiment of the smoking assembly 500 including an embodiment of the smoking device 400 coupled with an embodiment of the smoking article 100. The smoking device 400 has: a battery unit 410 at an end 402 of the smoking device 400; and a heating unit 420 at an open end 403 of the smoking device 400. The battery unit 410 contains a battery 411 and, optionally, a control circuit. The heating unit 420 includes a receptacle 430 for receiving the smoking article 100; and multiple induction coils 422 in the receptacle 430. The receptacle 430 is defined by a housing 431, a closed end 432 of the housing 431, and the open end 403. The smoking device 400 further includes a switch 426 on the housing 431 that activates the control circuit and/or the induction coils 422. One or more of the conductive elements 124 in the smoking article 100 are coupled with one or more of the induction coils 422, respectively. The heating unit 420 may further include a sealing element 424 proximal to the open end 403 that contacts the smoking article 100 (FIG. 5, not shown in FIG. 4). The When the smoking article 100 is inserted into the smoking device 400, each conductive element 124 may be aligned with one of the induction coils 422.

III. Smoking Assembly

FIGS. 3A-3D, and 4-5 show various embodiments of the smoking assembly 300/500 including an embodiment of the smoking article 100; and various embodiments of the smoking device 200/400. The smoking article 100 is received into the receptacle 221/431 of the smoking device 200/400; and one or more of the conductive elements 124 are coupled with one or more of the induction coils 222/422.

A smoking device may have a battery unit having a battery in a housing, with the battery electrically connected to an electronic controller and to a sensor; the housing having a receptacle for receiving a smoking article; and a plurality of induction coils electrically connected to the electronic controller, with the induction coils longitudinally spaced apart along the receptacle. The smoking device may further include a smoking article inserted into the receptacle, with the smoking article including a plurality of longitudinally spaced apart induction heating plates, with a volume of a smoking material between adjacent induction heating plates.

Figure 6:
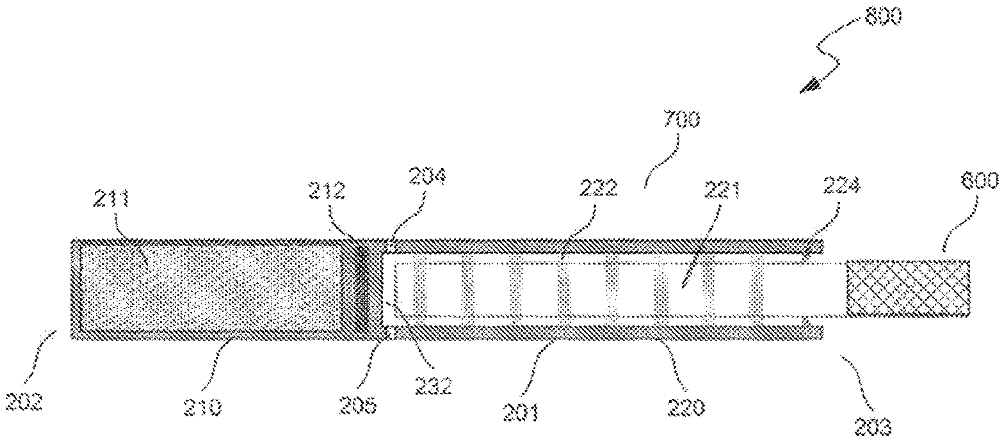
FIG. 6 is a section view of an embodiment of the smoking assembly.

The smoking assembly may have an embodiment of the smoking article and an embodiment of the smoking device integrated together. FIG. 6 shows an embodiment of the integrated smoking article 800 including a smoking article section 600, and a smoking device section 700. The smoking article section 600 has a similar configuration as the smoking article 100 described. The smoking device section 700 has a similar configuration as the smoking device 200 described supra, except that the smoking article section 600 cannot be separated from the smoking device section 700.

Thus, novel devices have been shown and described. Various modifications and substitutions may of course be made without departing from the spirit and scope of the invention.

The invention claimed is:

1. A vapor generator, comprising:

a battery unit including a battery in a battery housing, and a plurality of longitudinally spaced apart induction coils around a receptacle in the housing, the induction coils electrically connected to the battery;

a vapor article configured to be inserted into the receptacle, the vapor article including a non-conductive cylindrical article housing containing a plurality of spaced apart conductive round flat plates; the plates parallel to each other and perpendicular to a longitudinal axis of the housing; the plates in contact with an interior surface of the housing to form a plurality of compartments in the housing, the compartments containing a vapor medium; each plate having a through passage to allow air flow through the housing; and a seal at a first end of the receptacle, the seal engaging the vapor article.

2. The vapor generator of claim 1 further including a control circuit in the battery housing configured to separately control each of the induction coils.

3. The vapor generator of claim 1 wherein each induction coil is longitudinally aligned with one of the plates.

4. A vapor generator, comprising:

a battery unit including a battery in a battery housing, and a plurality of longitudinally spaced apart induction coils around a receptacle in the housing, the induction coils electrically connected to the battery;

a vapor article configured to be inserted into the receptacle, the vapor article including a non-conductive cylindrical article housing containing a plurality of spaced apart conductive round flat plates; the plates parallel to each other and perpendicular to a longitudinal axis of the housing; the plates in contact with an interior surface of the housing to form a plurality of compartments in the housing, the compartments containing a vapor medium; each plate having a through passage to allow air flow through the housing; and a mouthpiece on the vapor article projecting out of the receptacle when the vapor article is inserted into the receptacle.

5. The vapor generator of claim 4 further including a control circuit in the battery housing configured to separately control each of the induction coils.

6. The vapor generator of claim 4 wherein each induction coil is longitudinally aligned with one of the plates.

7. A vapor generator, comprising:

a battery unit including a battery in a battery housing, and a plurality of longitudinally spaced apart induction coils around a receptacle in the housing, the induction coils electrically connected to the battery;

a vapor article configured to be inserted into the receptacle, the vapor article including a non-conductive cylindrical article housing containing a plurality of spaced apart conductive round flat plates; the plates parallel to each other and perpendicular to a longitudinal axis of the housing; the plates in contact with an interior surface of the housing to form a plurality of compartments in the housing, the compartments containing a vapor medium; each plate having a through passage to allow air flow through the housing; and a filter on an end of the vapor article projecting out of the receptacle when the vapor article is inserted into the receptacle.

8. The vapor generator of claim 7 further including a control circuit in the battery housing configured to separately control each of the induction coils.

9. The vapor generator of claim 7 wherein each induction coil is longitudinally aligned with one of the plates.

* * * * *